Aug. 31, 1926.
F. J. RUNSER
STAND
Filed Dec. 10, 1923
1,598,016
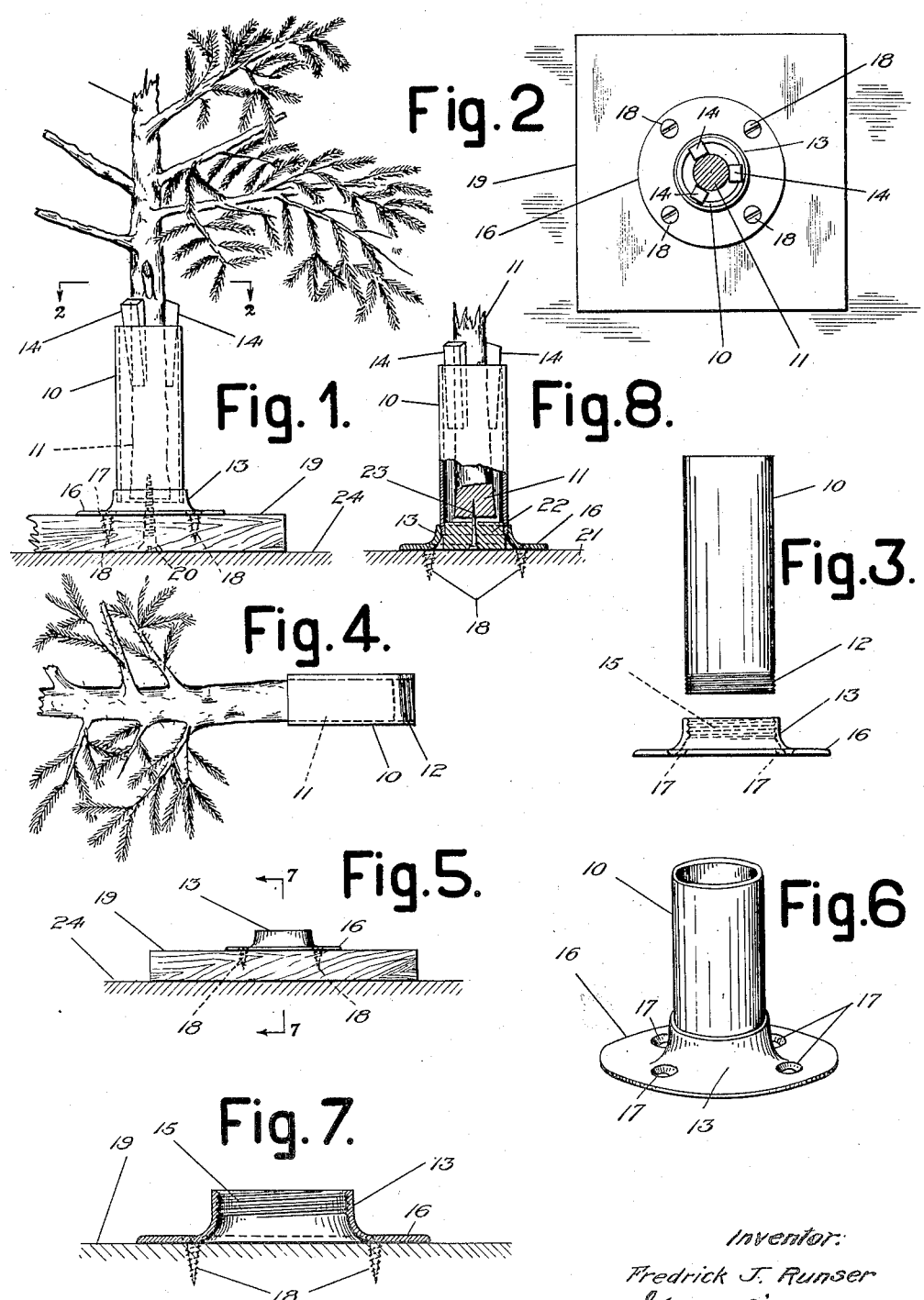

Patented Aug. 31, 1926.

1,598,016

UNITED STATES PATENT OFFICE.

FREDRICK J. RUNSER, OF CLEVELAND, OHIO, ASSIGNOR TO THE BYRNE MANUFACTURING COMPANY, OF CLEVELAND, OHIO, A CORPORATION OF OHIO.

STAND.

Application filed December 10, 1923. Serial No. 679,885.

The present invention relates to stands or supports of the socket type, and has more particular reference to a stand or support for Christmas trees and the like.

One object of the present invention is to construct a tree stand of this type in which one part may be attached to the floor or other sustaining surface and the other part may be secured to the trunk of the tree independently of the first part to facilitate their application in their relative positions, and to provide means for interlocking the parts together to support the tree.

Another object of the invention is to provide a tree stand with a relatively rigid socket portion adapted to prevent swaying or tilting of the tree out of its original set position, and which has a base member adapted to be secured to a support, and which is capable of being bent to conform to uneven surfaces to which it is applied, and which is also capable of taking up abnormal lateral strains without cracking or breaking.

Another object of the invention is to provide a tree stand of this character, which may be easily applied without the exercise of skill, and which may be quickly and easily assembled together.

Other objects of the invention will be apparent to those skilled in the art to which it relates from the following description taken in connection with the accompanying drawings, wherein Figure 1 is a side elevation of a tree stand embodying my invention;

Figure 2 is a horizontal section on the line 2—2 of Figure 1;

Figure 3 is a side elevation, enlarged, of the tree stand, showing the socket and base portions separated one from the other;

Figure 4 is a reduced side elevation of the socket portion of the stand as applied to the trunk of a tree in inclined position such as permits the easy application of the socket portion to the tree;

Figure 5 is a detailed view of the base portion of the stand applied to a supporting block, showing how the base portion may be easily applied after separation from the socket portion;

Figure 6 is a perspective view, enlarged, of the complete tree stand with the tree removed;

Figure 7 is an enlarged detail section on the line 7—7 of Figure 5; and

Figure 8 is a side elevation, partly in section, of a slightly modified form of the tree stand showing a tree mounted therein and showing the device secured directly to the floor.

Referring to the drawing, and particularly to Figures 1 to 7, 10 designates a socket portion, which is preferably in the form of a cylindrical sleeve of suitable length to receive a substantial portion of the lower end of a tree trunk 11, and which is provided at its lower end with external threads 12 adapted to detachably connect the socket 10 with a base member 13. The socket member 10 may be secured to the tree trunk 11 in the manner shown in Figure 4 with the tree lying down upon the floor or ground, and with the socket portion driven or otherwise suitably forced over the lower end of the tree trunk. As shown in Figures 1 and 2, if the tree trunk is of small diameter, and loosely fits in the socket member 10, one or more wedges 14 may be employed and driven downwardly into the top of the socket 10 about the trunk 11, so as to bind the tree trunk in position. I preferably use a plurality of wedges and space them around the trunk 11, so as to position the latter substantially centrally of the socket member.

The base portion or member of the tree stand comprises an upstanding collar having internal threads 15 adapted to receive the external threads 12 of the socket 10, so as to detachably couple the two parts together when the socket member 10 is turned, and an outwardly flaring flange 16 formed with a plurality of screw receiving openings 17 therethrough for the reception of screws 18, whereby the flange 16 may be secured to a block or other support 19.

The base member 13 is preferably made from hot rolled steel plates, for example, according to the process disclosed and claimed in my co-pending application Serial No. 659,951. When the base member is so made, its flange 16 is capable of being bent laterally to conform to any shape or irregularity which may be found in the block, floor or other surface to which the tree stand is applied, without danger of the flange cracking or breaking, as is the case with stands constructed of cast iron.

Another feature of this particular construction of base member is that it will not crack or break under the strain of load when imposed irregularly upon it, or due to the unevenness of the block or supporting surface.

The block, support or platform 19 may be provided with an upstanding pin or screw 20, which is preferably arranged centrally of the base member, and is of sufficient length to project up into the lower end of the socket 10 when the latter is secured in place.

The socket member is adapted to be secured to the tree trunk after it has been separated from the base member, and independently thereof, and the base member 13 is adapted to be attached to the block or other support 19 after the socket 10 has been removed, so that access may be readily had to the screws 18 for applying them in position. After the respective parts have been secured in their positions upon the tree and upon the block, they may be assembled together by (1) raising the tree trunk 11 and bringing the socket member 10 into registry with the base member 13, and the base and socket members may then be secured together by turning the tree and socket 10 upon the base member to screw the threads 12 into the threads 15 or (2) rotating the block 19 and base member 13 relative to the socket 10, and thus securely and detachably interlocking the base and socket together. After the socket and base members are secured together the anchoring and centering member 20 is inserted or positioned in the block with its free end projecting into the lower end of the tree trunk 11 (see Fig. 1) to rigidly hold the lower end of the tree trunk 11 centrally or axially of the socket 10 and from swaying or tilting about the wedges as a fulcrum.

As shown in Fig. 1, the anchoring member 20 is inserted in position from the underside of the block 19. Accordingly, when the block is positioned on the floor or other supporting surface, the head of the anchoring member will engage this surface so that the latter will serve to prevent the anchoring member from getting loose and disengaging the tree trunk.

Figure 8 illustrates a slight modification, wherein the base member 13 is secured by its flange 16 and screws 18 directly to the floor 21 instead of to the block 19. In this instance a relatively small insertible block 22 is fitted in the base member 13, and is preferably reduced at its upper end so as to project into the lower open end of the socket 10. The purpose of the block 22 is to provide a support for an anchoring member 23, which may be a nail, screw or the like, as shown. The block 22 is preferably of sufficient height to rest upon the floor 21 within the base member, so that when the socket 10 and base 13 are assembled and secured to the floor the head of the anchoring device 13 will engage the latter and thus be prevented from disengaging the tree.

In assembling the parts as shown in Fig. 8, the socket is first positioned on the tree trunk 11, then the base 13 is screwed onto the lower end of the socket, then the block or support 22 is fitted into the base 13 and finally the anchoring device is driven through the block into the trunk end. The tree and stand are then positioned on the floor and screws 18 applied to secure the flange 16 to the floor 21.

In the form shown in Figures 1 to 7, the block 19 is adapted to be placed upon the floor 24, but not secured to it so as to prevent injury or marring of the floor, while in Figure 8 the base member 13 is attached directly to the floor 21. The difference in these forms simply being that in the construction shown in Figure 8 a small block 22 is used for carrying the anchoring member 23, while in the first form the base member 13 is attached to the block 19 which serves for not only supporting the base member but also supporting the anchoring member 20.

It is obvious that various changes and modifications may be made in the details of construction and design of the above specifically described embodiment of this invention without departing from the spirit thereof, such changes and modifications being restricted only by the scope of the following claims.

What I claim is:

1. In a tree stand, the combination of a relatively large tubular member adapted to be telescoped on and embrace a tree trunk and having external threads at its outer end, an annular base having an upstanding tubular wall provided with internal screw threads arranged to engage the screw-threaded end of said tubular member and adapted to be connected thereto after it is sleeved on the tree, a device removably associated with one of said elements adjacent the lower end of said tubular member, and an element extending through said device and removably engaging the lower end of the tree trunk.

2. In a tree stand, the combination of a relatively large tubular member adapted to be telescoped on and embrace a tree trunk and having external threads at its outer end, an annular base having an upstanding tubular wall provided with internal screw threads arranged to engage the screw-threaded end of said tubular member and adapted to be connected thereto after it is sleeved on the tree, means for securing the annular base to a supporting surface, a device arranged within said base in engagement with the supporting surface and telescopically fitting the lower end of said tubular member, and means extending through said device and removably engaging the lower free end of the tree trunk.

3. In a tree stand, the combination of a relatively large tubular member adapted to be telescoped on and embrace a tree trunk and having external threads at its outer end, an annular base having an upstanding tubular wall provided with internal screw threads arranged to engage the screw-threaded end of said tubular member and adapted to be connected thereto after it is sleeved on the tree, means for securing the annular base to a supporting surface, a device arranged within said base in engagement with the supporting surface and telescopically fitting the lower end of said tubular member, and an element extending through said device and removably engaging the lower free end of the tree trunk, the head of said device engaging the supporting surface to prevent its removal.

4. In a tree stand, the combination of a relatively large tubular member having external screw threads on its outer end adapted to be sleeved on and embrace a tree trunk, a relatively bendable base comprising an annular flange having an integral upstanding tubular wall provided with screw threads arranged to engage the screw-threaded end of said tubular member, means for rigidly securing the flange of said base to a supporting surface, a plurality of wedges adapted to be driven in to the inner end of said tubular member to support the upper portion of the tree trunk in rigid relation to said tubular member, and means removably engaging the lower end of the tree trunk and co-acting with said wedges to prevent tipping of the tree.

In testimony whereof, I have hereunto subscribed my name.

FREDRICK J. RUNSER.